(12) United States Patent
Slik (10) Patent No.: US 11,977,624 B2
(45) Date of Patent: *May 7, 2024

(54) METHODS FOR MANAGING VERIFICATION AND VALIDATION OF THIRD-PARTY CODE AND DEVICES THEREOF

(71) Applicant: NetApp, Inc., San Jose, CA (US)

(72) Inventor: David Slik, Vancouver (CA)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/101,952

(22) Filed: Jan. 26, 2023

(65) Prior Publication Data

US 2023/0205868 A1 Jun. 29, 2023

Related U.S. Application Data

(63) Continuation of application No. 17/217,356, filed on Mar. 30, 2021, now Pat. No. 11,586,725.

(51) Int. Cl.
*G06F 21/00* (2013.01)
*G06F 21/51* (2013.01)
*G06F 21/57* (2013.01)
*G06F 21/64* (2013.01)

(52) U.S. Cl.
CPC .............. *G06F 21/51* (2013.01); *G06F 21/57* (2013.01); *G06F 21/64* (2013.01); *G06F 2221/033* (2013.01); *G06F 2221/2135* (2013.01)

(58) Field of Classification Search
CPC .......... G06F 21/51; G06F 21/57; G06F 21/64; G06F 2221/033; G06F 2221/2135
See application file for complete search history.

(56) References Cited

U.S. PATENT DOCUMENTS

| | | |
|---|---|---|
| 8,145,992 B2 | 3/2012 | Jacquin et al. |
| 8,448,130 B1 | 5/2013 | Pillarisetti et al. |
| 8,793,471 B2 | 7/2014 | Serebrin et al. |
| 8,984,286 B2 * | 3/2015 | Dixon ............... H04L 9/3247 |
| | | 713/168 |
| 9,058,483 B2 | 6/2015 | Chen et al. |
| 10,805,087 B1 | 10/2020 | Allen |
| 10,979,440 B1 | 4/2021 | Kalika |

(Continued)

FOREIGN PATENT DOCUMENTS

WO 2020096639 A1 5/2020

OTHER PUBLICATIONS

Aktas E., et al., "Continuous, Low Overhead, Run-Time Validation of Program Executions," 47th Annual IEEE/ACM International Symposium on Microarchitecture, 2014, pp. 229-241.

*Primary Examiner* — Ghazal B Shehni
(74) *Attorney, Agent, or Firm* — Troutman Pepper Hamilton Sanders LLP (NetApp)

(57) ABSTRACT

The disclosed technology relates to receiving an executable function from a client device, wherein the executable function is to be executed on a function as a service (FaaS) platform. Upon performing a verification and validation process on the received executable function prior to runtime, it is determined when to execute the received executable function based on based on one or more execution initiation techniques upon performing. The verified and validated executable function is executed at the runtime on the FaaS platform based on the determination.

17 Claims, 6 Drawing Sheets

(56) References Cited

U.S. PATENT DOCUMENTS

| | | |
|---|---|---|
| 11,586,725 B2 | 2/2023 | Slik |
| 11,615,181 B2 | 3/2023 | Slik |
| 2010/0287547 A1 | 11/2010 | Korkishko et al. |
| 2017/0180318 A1 | 6/2017 | Lutas et al. |
| 2017/0323120 A1 | 11/2017 | Anderson |
| 2018/0260301 A1* | 9/2018 | Podjarny ............. G06F 16/2379 |
| 2018/0367528 A1 | 12/2018 | Schwarz et al. |
| 2021/0294732 A1 | 9/2021 | Underseth |
| 2022/0158831 A1 | 5/2022 | Wing et al. |

* cited by examiner

```
block $B0
    loop $L1
        get_local $counter
        i32.const 10
        i32.ge_u
        br_if $B0
        get_local $counter
        i32.const 1
        i32.add
        set_local $counter
        br $L1
    end
end
```

FIG. 6

METHODS FOR MANAGING VERIFICATION AND VALIDATION OF THIRD-PARTY CODE AND DEVICES THEREOF

This application is a continuation of U.S. patent application Ser. No. 17/217,356, filed Mar. 30, 2021, which is hereby incorporated by reference in its entirety. This application is related to U.S. patent application Ser. No. 17/217,345, filed Mar. 30, 2021.

FIELD

The present technology pertains to the field of storage management, and particularly, directed to a method for managing verification and validation of third-party code and devices.

BACKGROUND

Function as a service (FaaS) is a category of cloud computing services that provides a platform allowing customers to develop, run, and manage application functionalities without the complexity of building and maintaining the infrastructure typically associated with developing and launching an application. In other words, FaaS is a serverless way to execute modular pieces of code on a platform where the developers write and update a piece of code on the fly and the code can then be executed in response to an event. However, for the purpose of detecting and preventing a security threat, prior technologies perform verification and validation of the piece of code during run-time while executing the code in response to an event.

Unfortunately, performing the verification and validation of the piece of code at run-time requires significant runtime resources and therefore results in substantial amount of latency to execute the piece of code. For example, one of the operations performed during this code verification and validation that consumes a significant amount of resources at runtime leading to latency in execution of code involves determining if code is in a valid format and structure. To save these resources, one option is not performing code verification and validation (blind trust). However, failing to perform the code verification and validation can lead to security vulnerabilities being exploited by the third-party code. Accordingly, the prior technologies fails to disclose a technique of performing code verification and validation on a FaaS platform such that there is no latency experienced during the execution of the code.

DETAILED DESCRIPTION

Figure 1:
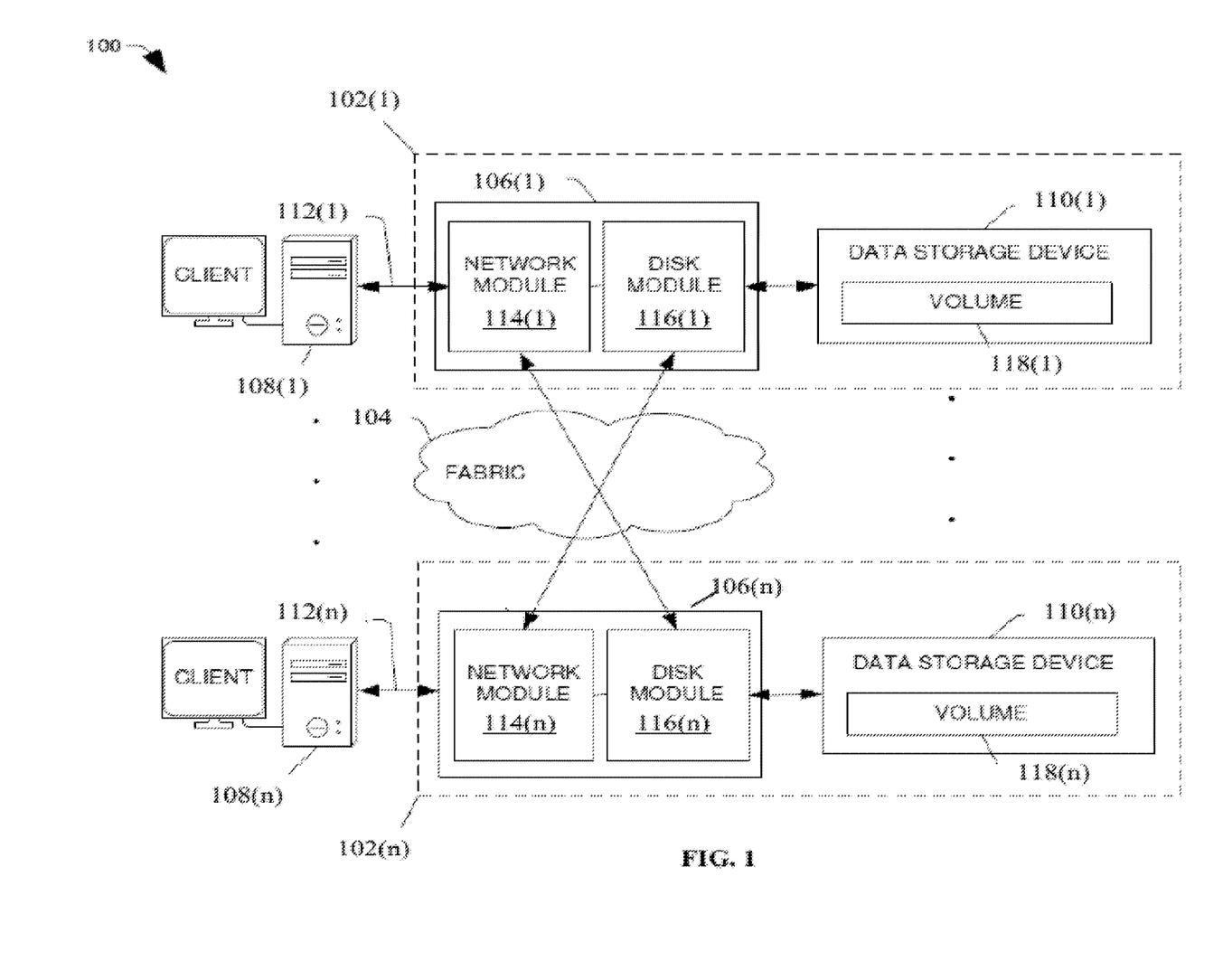
FIG. 1 is a block diagram of a network environment with exemplary data storage apparatuses each including a node computing device.

A clustered network environment 100 that may implement one or more aspects of the technology described and illustrated herein is shown in FIG. 1. The clustered network environment 100 includes data storage apparatuses 102(1)-102(n) that are coupled over a cluster fabric 104 facilitating communication between the data storage apparatuses 102(1)-102(n) (and one or more modules, components, etc. therein, such as, node computing devices 106(1)-106(n), for example), although any number of other elements or components can also be included in the clustered network environment 100 in other examples.

This technology provides a number of advantages including methods, non-transitory computer readable media, and devices that more effectively manages verification and validation of third-party code. With the disclosed technology, the verification and validation phase of the software code is separated and decoupled from the execution phase of the software code. In the disclosed technology, when an end-user or application vendor wants to load a function (software code) into a Function as a Service (FaaS) platform, the function is first sent to a function validator service which performs the following operation: 1. validate the format and structure of the function; 2. validate security characteristics of the function; 3. add additional security functionality (e.g. extended input validation); 4. customize or translate the function for the FaaS platform; 5. add location-independent abstractions for data access; 6. add metering code and hooks; 7. add monitoring code and hooks; and 8. add other code as required/desired by the FaaS operator or virtual operator. Next, the validated and processed function is then added to an internal catalog and is deployed to the FaaS platforms for use, or returned to the end-user or application vendor for future submission to the FaaS platform. At this point, the function can be executed, and the added characteristics are ensured during execution. By using the below illustrated techniques, the disclosed technology is able to complete the verification and validation prior to run time thereby avoiding any latency that may occur due to in-depth checks and modifications at run-time.

In this example, node computing devices 106(1)-106(n) can be primary or local storage controllers or secondary or remote storage controllers that provide client devices 108(1)-108(n), with access to data stored within data storage devices 110(1)-110(n). The data storage apparatuses 102(1)-102(n) and/or node computing device 106(1)-106(n) of the examples described and illustrated herein are not limited to any particular geographic areas and can be clustered locally and/or remotely. Thus, in one example the data storage apparatuses 102(1)-102(n) and/or node computing device 106(1)-106(n) can be distributed over a plurality of storage systems located in a plurality of geographic locations. In another example, a clustered network can include data storage apparatuses 102(1)-102(n) and/or node computing device 106(1)-106(n) residing in a same geographic location (e.g., in a single onsite rack).

In the illustrated example, one or more of the client devices 108(1)-108(n), which may be, for example, personal computers (PCs), computing devices or storage (e.g., storage servers), and other computers or peripheral devices, are coupled to the respective data storage apparatuses 102(1)-102(n) by storage network connections 112(1)-112(n). Network connections 112(1)-112(n) may include a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc.

Illustratively, the client devices 108(1)-108(n) may be general-purpose computers running applications, and may interact with the data storage apparatuses 102(1)-102(n) using a client/server model for exchange of information. That is, the client devices 108(1)-108(n) may request data from the data storage apparatuses 102(1)-102(n) (e.g., data on one of the data storage devices 110(1)-110(n) managed by a network storage control configured to process I/O commands issued by the client devices 108(1)-108(n)), and the data storage apparatuses 102(1)-102(n) may return results of the request to the client devices 108(1)-108(n) via the storage network connections 112(1)-112(n).

The node computing devices 106(1)-106(n) of the data storage apparatuses 102(1)-102(n) can include network or host nodes that are interconnected as a cluster to provide data storage and management services, such as to an enterprise having remote locations, cloud storage (e.g., a storage endpoint may be stored within a data cloud), etc., for example. Such a node computing device 106(1)-106(n) can be a device attached to the fabric 104 as a connection point, redistribution point, or communication endpoint, for example. One or more of the node computing devices 106(1)-106(n) may be capable of sending, receiving, and/or forwarding information over a network communications channel, and could comprise any type of device that meets any or all of these criteria.

In an example, the node computing device 106(1) may be located on a first storage site and the node computing device 106(n) may be located at a second storage site. The node computing devices 106(1) and 106(n) may be configured according to a disaster recovery configuration whereby a surviving node provides switchover access to the storage devices 110(1)-110(n) in the event a disaster occurs at a disaster storage site (e.g., the node computing device 106(1) provides client device 108(n) with switchover data access to storage devices 110(n) in the event a disaster occurs at the second storage site). In other examples, the node computing device 106(n) can be configured according to an archival configuration and/or the node computing devices 106(1)-106(n) can be configured based on another type of replication arrangement (e.g., to facilitate load sharing). Additionally, while two node computing devices 106 are illustrated in FIG. 1, any number of node computing devices or data storage apparatuses can be included in other examples in other types of configurations or arrangements.

As illustrated in the clustered network environment 100, node computing devices 106(1)-106(n) can include various functional components that coordinate to provide a distributed storage architecture. For example, the node computing devices 106(1)-106(n) can include network modules 114(1)-114(n) and disk modules 116(1)-116(n). Network modules 114(1)-114(n) can be configured to allow the node computing devices 106(1)-106(n) (e.g., network storage controllers) to connect with client devices 108(1)-108(n) over the storage network connections 112(1)-112(n), for example, allowing the client devices 108(1)-108(n) to send input-output operations to the node computing devices 106(1)-106(n).

Further, the network modules 114(1)-114(n) can provide connections with one or more other components through the cluster fabric 104. For example, the network module 114(1) of node computing device 106(1) can access the data storage device 110(n) by sending a request via the cluster fabric 104 through the disk module 116(n) of node computing device 106(n) when the node computing device 106(n) is available. Alternatively, when the node computing device 106(n) fails, the network module 114(1) of node computing device 106(1) can access the data storage device 110(n) directly via the cluster fabric 104. The cluster fabric 104 can include one or more local and/or wide area computing networks embodied as Infiniband, Fibre Channel (FC), or Ethernet networks, for example, although other types of networks supporting other protocols can also be used.

Disk modules 116(1)-116(n) can be configured to connect data storage devices 110(1)-110(n), such as disks or arrays of disks, SSDs, flash memory, or some other form of data storage, to the node computing devices 106(1)-106(n). Often, disk modules 116(1)-116(n) communicate with the data storage devices 110(1)-110(n) according to the SAN protocol, such as SCSI, FCP, SAS, NVMe, NVMe-oF for example, although other protocols can also be used. Thus, as seen from an operating system on node, either of computing devices 106(1)-106(n), the data storage devices 110(1)-110(n) can appear as locally attached. In this manner, different node computing devices 106(1)-106(n), etc. may access data blocks through the operating system, rather than expressly requesting abstract files.

While the clustered network environment 100 illustrates an equal number of network modules 114(1)-114(n) and disk modules 116(1)-116(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 108(1)-108(n) can be networked with the node computing devices 106(1)-106(n) in the cluster, over the storage connections 112(1)-112(n). As an example, respective client devices 108(1)-108(n) that are networked to a cluster may request services (e.g., exchanging of information in the form of data packets) of node computing devices 106(1)-106(n) in the cluster, and the node computing devices 106(1)-106(n) can return results of the requested services to the client devices 108(1)-108(n). In one example, the client devices 108(1)-108(n) can exchange information with the network modules 114(1)-114(n) residing in the node computing devices 106(1)-106(n) (e.g., network hosts) in the data storage apparatuses 102(1)-102(n).

In one example, the storage apparatuses 102(1)-102(n) host aggregates corresponding to physical local and remote data storage devices, such as local flash or disk storage in the data storage devices 110(1)-110(n), for example. One or more of the data storage devices 110(1)-110(n) can include mass storage devices, such as disks of a disk array. The disks may comprise any type of mass storage devices, including but not limited to magnetic disk drives, flash memory, SSDs, storage class memories and any other similar media adapted to store information, including, for example, data (D) and/or parity (P) information.

The aggregates include volumes 118(1)-118(n) in this example, although any number of volumes can be included in the aggregates. The volumes 118(1)-118(n) are virtual data stores that define an arrangement of storage and one or more file systems within the clustered network environment 100. Volumes 118(1)-118(n) can span a portion of a disk or other storage device, a collection of disks, or portions of disks, for example, and typically define an overall logical arrangement of file storage. In one example volumes 118(1)-118(n) can include stored data as one or more files or objects that reside in a hierarchical directory structure within the volumes 118(1)-118(n). Volumes 118(1)-118(n) are typically configured in formats that may be associated with particular storage systems, and respective volume formats typically comprise features that provide functionality to the volumes 118(1)-118(n), such as providing an ability for volumes 118(1)-118(n) to form clusters.

In one example, to facilitate access to data stored on the disks or other structures of the data storage device 110(1)-110(n), a file system (e.g., write anywhere file system (WAFL)) may be implemented that logically organizes the information as a hierarchical structure of directories and files. In this example, respective files may be implemented as a set of disk blocks configured to store information, whereas directories may be implemented as specially formatted files in which information about other files and directories are stored.

Data can be stored as files or objects within a physical volume and/or a virtual volume, which can be associated with respective volume identifiers, such as file system identifiers (FSIDs). The physical volumes correspond to at least a portion of physical storage devices, such as the data storage device 110(1)-110(n) (e.g., a Redundant Array of Independent (or Inexpensive) Disks (RAID system)) whose address, addressable space, location, etc. does not change. Typically the location of the physical volumes does not change in that the (range of) address(es) used to access it generally remains constant.

Virtual volumes, in contrast, are stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows them to be resized and/or flexible in some regards.

Further, virtual volumes can include one or more logical unit numbers (LUNs), directories, Qtrees, and/or files. Among other things, these features, but more particularly the LUNS, allow the disparate memory locations within which data is stored to be identified, for example, and grouped as a data storage unit. As such, the LUNs may be characterized as constituting a virtual disk or drive upon which data within the virtual volumes is stored within an aggregate. For example, LUNs are often referred to as virtual disks, such that they emulate a hard drive, while they actually comprise data blocks stored in various parts of a volume.

In one example, the data storage devices 110(1)-110(n) can have one or more physical ports, wherein each physical port can be assigned a target address (e.g., SCSI target address). To represent respective volumes, a target address on the data storage devices 110(1)-110(n) can be used to identify one or more of the LUNs. Thus, for example, when one of the node computing devices 106(1)-106(n) connects to a volume, a connection between the one of the node computing devices 106(1)-106(n) and one or more of the LUNs underlying the volume is created.

In one example, respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 2:
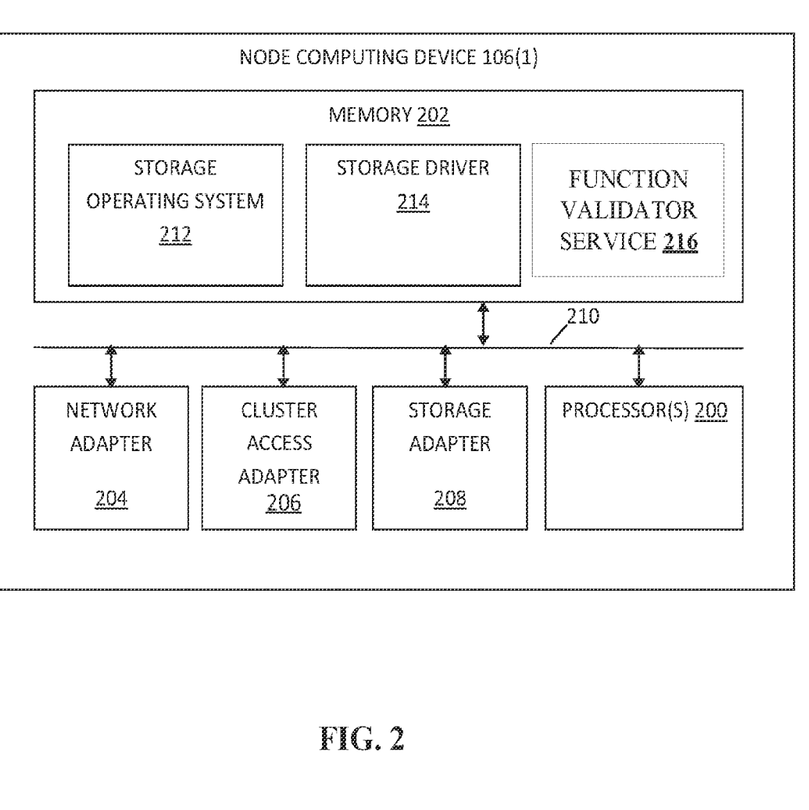
FIG. 2 is a block diagram of an exemplary one of the node computing devices shown in FIG. 1.

Referring to FIG. 2, node computing device 106(1) in this particular example includes processor(s) 200, a memory 202, a network adapter 204, a cluster access adapter 206, and a storage adapter 208 interconnected by a system bus 210. The node computing device 106 also includes a storage operating system 212 installed in the memory 206 that can, for example, implement a Redundant Array of Independent (or Inexpensive) Disks (RAID) data loss protection and recovery scheme to optimize a reconstruction process of data of a failed disk or drive in an array. In some examples, the node computing device 106(n) is substantially the same in structure and/or operation as node computing device 106(1), although the node computing device 106(n) can include a different structure and/or operation in one or more aspects than the node computing device 106(1) in other examples.

The storage operating system 212 can also manage communications for the node computing device 106(1) among other devices that may be in a clustered network, such as attached to a cluster fabric 104. Thus, the node computing device 106(1) can respond to client device requests to manage data on one of the data storage devices 110(1)-110(n) (e.g., or additional clustered devices) in accordance with the client device requests.

The storage operating system 212 can also establish one or more file systems including software code and data structures that implement a persistent hierarchical namespace of files and directories, for example. As an example, when a new data storage device (not shown) is added to a clustered network system, the storage operating system 212 is informed where, in an existing directory tree, new files associated with the new data storage device are to be stored. This is often referred to as "mounting" a file system.

In the example node computing device 106(1), memory 202 can include storage locations that are addressable by the processor(s) 200 and adapters 204, 206, and 208 for storing related software application code and data structures. The processor(s) 200 and adapters 204, 206, and 208 may, for example, include processing elements and/or logic circuitry configured to execute the software code and manipulate the data structures. Additionally, as illustrated in FIG. 2, the memory 202 of the node computing device 106(1) also includes a functional validator service 216 that assists with verification and validation of the code that is provided by the client devices 108(1)-108(n), although the functional validator service 216 can be configured to perform other operations or processes on functions.

The storage operating system 212, portions of which are typically resident in the memory 202 and executed by the processor(s) 200, invokes storage operations in support of a file service implemented by the node computing device 106(1). Other processing and memory mechanisms, including various computer readable media, may be used for storing and/or executing application instructions pertaining to the techniques described and illustrated herein. For example, the storage operating system 212 can also utilize one or more control files (not shown) to aid in the provisioning of virtual machines.

Accordingly, the examples may be embodied as one or more non-transitory computer readable media having machine or processor-executable instructions stored thereon for one or more aspects of the present technology, as described and illustrated by way of the examples herein, which when executed by the processor(s) 200, cause the processor(s) 200 to carry out the steps necessary to implement the methods of this technology, as described and illustrated with the examples herein. In some examples, the executable instructions are configured to perform one or more steps of a method, such as one or more of the exemplary methods described and illustrated later with reference to FIGS. 3-6, for example.

The network adapter 204 in this example includes the mechanical, electrical and signaling circuitry needed to connect the node computing device 106(1) to one or more of the client devices 108(1)-108(n) over storage network connections 112(1)-112(n), which may comprise, among other things, a point-to-point connection or a shared medium, such as a local area network. In some examples, the network adapter 204 further communicates (e.g., using TCP/IP) via the fabric 104 and/or another network (e.g. a WAN) (not shown) with cloud storage devices to process storage operations associated with data stored thereon.

The storage adapter 208 cooperates with the storage operating system 212 executing on the node computing device 106(1) to access information requested by one of the client devices 108(1)-108(n) (e.g., to access data on a data storage device 110(1)-110(n) managed by a network storage controller). The information may be stored on any type of attached array of writeable media such as magnetic disk drives, SSDs, and/or any other similar media adapted to store information.

In the exemplary data storage devices 110(1)-110(n), information can be stored in data blocks on disks. The storage adapter 208 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)), non-volatile memory express (NVMe), or non-volatile memory express over fabrics (NVMeoF). The information is retrieved by the storage adapter 208 and, if necessary, processed by the processor(s) 200 (or the storage adapter 208 itself) prior to being forwarded over the system bus 210 to the network adapter 204 (and/or the cluster access adapter 206 if sending to another node computing device in the cluster) where the information is formatted into a data packet and returned to a requesting one of the client devices 108(1)-108(n), or alternatively sent to another node computing device attached via the cluster fabric 104. In some examples, a storage driver 214 in the memory 202 interfaces with the storage adapter to facilitate interactions with the data storage devices 110(1)-110(n), as described and illustrated in more detail later with reference to FIGS. 3-6.

Now, an exemplary method for managing verification and validation of third-party code will be illustrated with reference to FIGS. 3-6. Particularly with reference to FIG. 3, the exemplary method begins at step 305 where the node computing device 106(1) receives executable code from one of the client devices 108(1)-108(n), although the node computing device 106(1) can receive other types or amounts of code from other devices. In this example, the node computing device 106(1) is configured to provide function as a service (FaaS). FaaS is a category of cloud computing services that provides a platform allowing client devices to develop, run, and manage application functionalities without the complexity of building and maintaining the infrastructure typically associated with developing and launching application. In other words, FaaS allows the client devices 108(1)-108(n) to develop write and update a piece of code on the fly, which can then be executed in response to an event, such as a user creating, reading, writing, or deleting a document stored in the volumes 118(1)-118(n). Additionally, in this example, the requesting one of the client devices 108(1)-108(n) can also send a name (function name) of the executable code along with the executable code.

Figure 4:
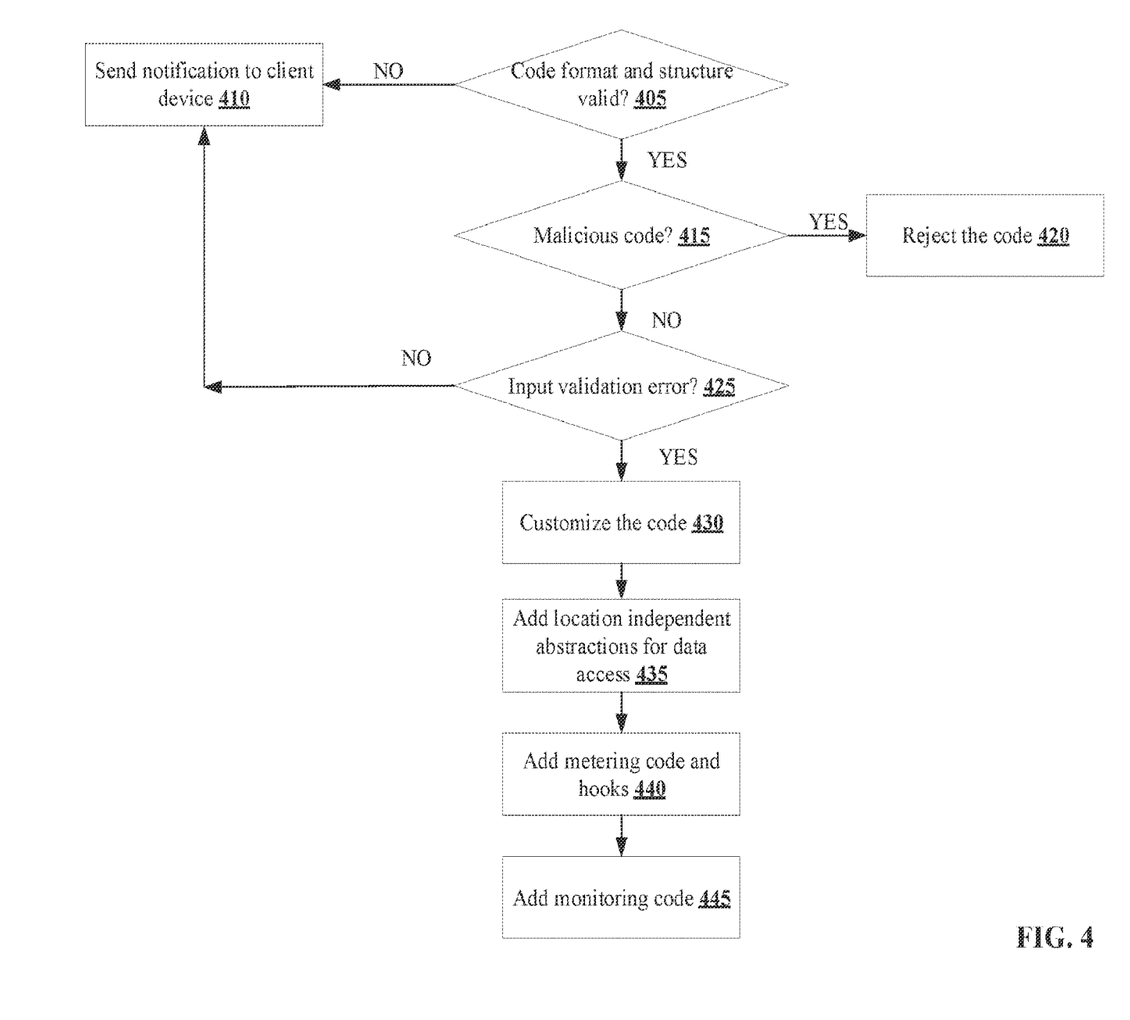
FIG. 4 is a flowchart of an exemplary method for performing verification and validation of a function.

Next in step 310, the function validator service 216 within the node computing device 106(1) performs the code verification and validation which will now be illustrated with reference to FIG. 4. In step 405, the functional validator service 216 verifies and validates the format and structure of the code that is received from one of the client devices 108(1)-108(n) by comparing the received software code against a stored software code specification and policy. In this example, format and the structure of the code relates to executable instructions of the software code, the data provided as part of the executable code, annotations included with the executable code, the flow graph of the executable code, and external references made from the executable code, although format and structure can include other types characteristics associated with the software code. In this example, verifying and validating of the structure and the format of the software code relates to ensuring that the received software code complies with the software code specification and policy set forth by an organization that includes permitted instructions, permitted parameters, permitted operations, permitted flow graphs, permitted recursion, permitted external invocations, restrictions on the combination and sequence of operations, spacial and temporal bounds restrictions, and restrictions on local data references, external execution calls, and external data references, although the software code policy can include other types or amounts of information.

Figure 5:
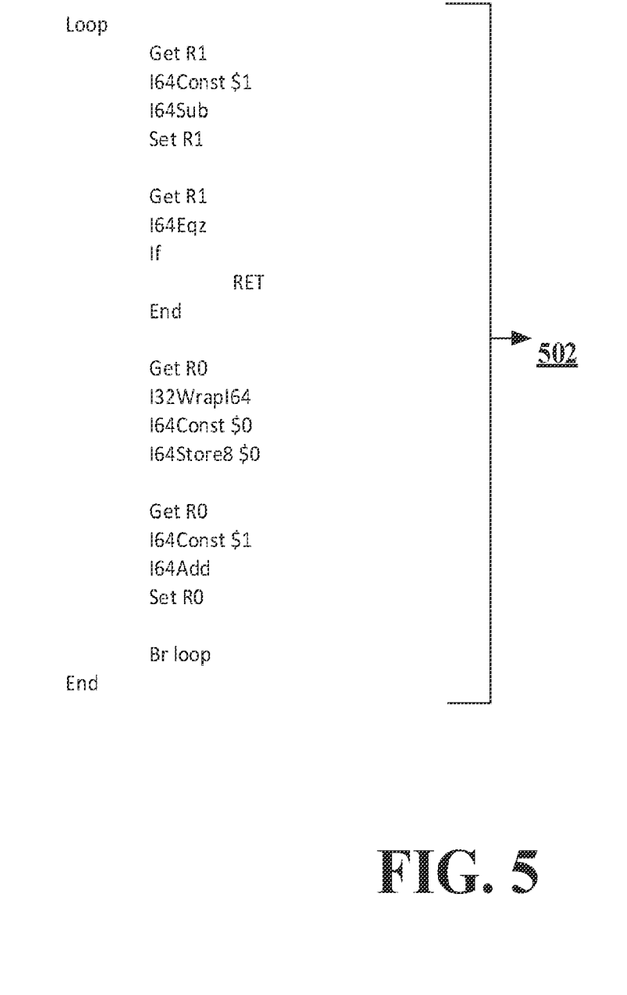
FIG. 5 is an exemplary function that can be executed on a FaaS.

An example of step 405 will now be illustrated with reference to FIG. 5. By way of an example, FIG. 5 illustrates a software code 502, which includes comment 504. Accordingly, if the software code policy requires that annotations or assertions should be present restricting conditions or states, the functional validator service 216 within the node computing device 106(1) analyzes the received code against this additional policy. In the example software code 502 illustrated in FIG. 5, the software code 502 includes a loop that sets a range of storage or memory addresses to the value "0". An example of software code policy could be that the number of times the loop can be executed is bounded to 200, which would require the value provided for R1 to be in the range of 1-201 in order to ensure that the number of loop executions is equal or less than 200. A call by a second piece of code where R1 is set to 0 would thus be invalid, as when 1 is subtracted from 0, R1 would be set to the maximum value stored in a UINT. Therefore, functional validator service 216 validates the structure and format of the software code 502 as the software code 502 is in compliant with the software code policy. This analysis can be computationally expensive and can take a long time to perform.

Referring back to step 405 of FIG. 4, if the functional validator service 216 determines that the received code is not in compliant with the software code policy, then the No branch is taken to branch 410 where a notification is sent out to the sending one of the client devices 108(1)-108(n) indicating that the received code is not in compliance with the software code policy as described in greater detail below. However, when the functional validator service 216 determines that the received code is in compliance with the software code policy, then the Yes branch is taken to step 415.

In step 415, the functional validator service 216 within the node computing device 106(1) determine if there is any malicious code present in the received software code. In this example, the functional validator service 216 within the node computing device 106(1) can analyze data modifications or data accesses the received software code is capable of performing to determine if the software is permitted to perform theses accesses, and scan for signatures of known malicious code currently stored in a database. When malicious modifications, accesses or signatures are detected, then the functional validator service 216 determines that the received software code includes malicious software code, although other techniques can be used to make the determination, such as ones which do not require an exact match. This analysis can be computationally expensive and can take a long time to perform.

Figure 6:
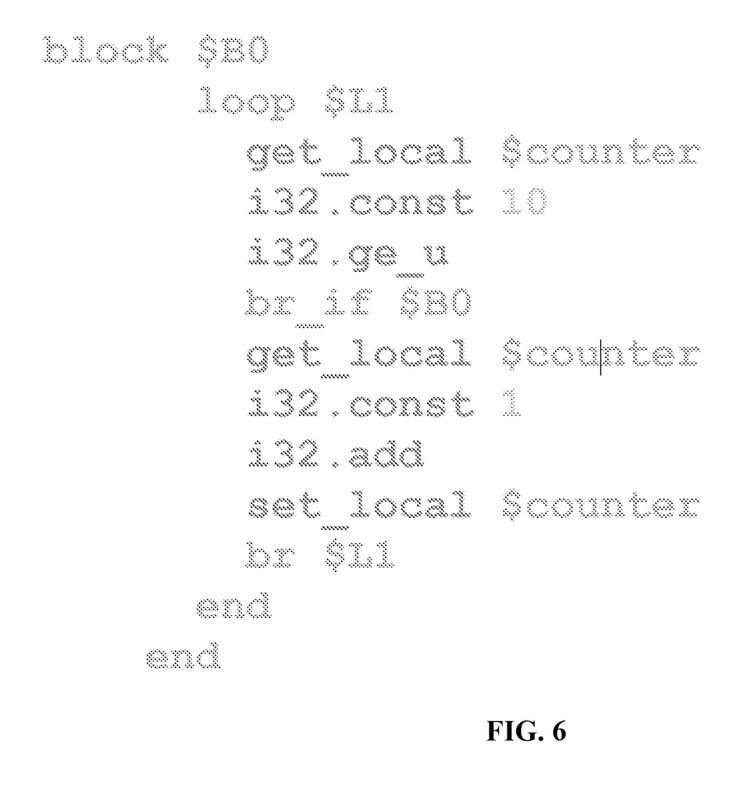
FIG. 6 is an exemplary image illustrating a legitimate code and a malicious code.

An example of step 415 will now be illustrated with reference to FIG. 6. In this example, FIG. 6 illustrates source code representations of lines of received code 600. Referring back to step 415, if the functional validator service 216 determines that the received code includes malicious or erroneous code, then the Yes branch is taken to step 420 where the exemplary method rejects the code without executing and the exemplary method ends. However, if the functional validator service 216 determines that there is no malicious code present in the received software code, then the No branch is taken to step 425. When received code 600 is invoked by reference, the stored and validated code is executed. If received code 600 is sent at execution time, the signature of the code is compared with the stored signature, and the supplied code is only executed if the signatures match.

Referring back to step 415, if the functional validator service 216 determines that the received code includes malicious code, then the Yes branch is taken to step 420 where the exemplary method rejects the code without executing and the exemplary method ends. However, if the functional validator service 216 determines that there is no malicious code present in the received software code, then the No branch is taken to step 425.

In step 425, the functional validator service 216 determines if there is any input data validation errors or missing input validation. In this example, FIG. 6 illustrates source code representations of lines of received code 600. Referring back to step 425, if the functional validator service 216 determines that the received code has input data validation errors or missing input validation, additional input validation code can be added (in received code 600, a check on $counter to ensure that its value at the beginning of the code block is less than or equal to 10). Input data validation functionality relates to functionality that is configured to ensure that input data parameters in within the received code is accurate and complies with the requirements of the corresponding input field. In this example, extended input validation can include using data validation rules such as data type (integer, float, string), range, uniqueness (ex. postal code), consistent expressions (ex. using one of St., Str., or Street), and no null values to ensure that the input data in the received code is accurate and complies with the requirement of the input field. By way of example, if the range of the input that is be accepted is between 1-10 but the code permits an input of the value greater than 10, then the functional validator service 216 would use the rule of the data range to determine that there is an input data validator error. Accordingly, if the functional service validator 216 determines that there is an input validation error, then the Yes branch is taken to step 410 where a notification is sent back to the one of the client devices 108(1)-108(n). However, if the functional service validator 216 determines that there are no errors identified through the extended input data validation, or that additional input validation can be inserted to correct the issue, then the Yes branch is taken to step 430.

In step 430, the functional service validator 216 within the node computing device 106(1) can customize or translate the received code so that it could be executed on the FaaS platform hosted by the node computing device 106(1). In this example, customizing or translating the received code can include compiling the code for a specific architecture and platform, cross-compiling the code for a different architecture and platform, re-compiling the code for a different platform, packaging the code such that only a portion of the code can be executed at run-time or transforming the code such that only limited memory is consumed during run-time, although other types of customization or transformation may be performed on the received code.

In step 435, the functional service validator 216 adds location-independent abstractions for data access to the received code such that access to the data is not linked to specific memory addresses, LUN addresses, file system paths or devices. When the code is executed, references to location-independent data is resolved by the added code or by the storage system, although other means of resolving location-independence data can be added to and performed by the received code.

In step 440, the functional service validator 216 adds metering code within the received code. In this example, metering code relates to a piece of software code that can assist with determining resource usage and costs associated with execution of the software code. By way of example, the metering code can assist with determining the computing resources required to execute the code, tracking of the execution of the received code for accounting purposes, although the metering code can be configured to perform other types or amounts of different functions. Alternatively, the metering code can assist with determining whether the client devices 108(1)-108(n) have a valid subscription to execute on the FaaS platform hosted by the node computing device 106(1). Accordingly, when the node computing device 106(1) determines that client devices 108(1)-108(n) fails to have a valid subscription, then the node computing device 106(1) can reject or revoke the client devices 108(1)-108(n) request to execute the received executable function on the FaaS platform.

In step 445, the functional service validator 216 within the node computing device 106(1) adds monitoring code to the received code to monitor the execution of the received code. By way of example, the monitoring code can include code lines, which when executed, can provide notification when the code starts execution, completes execution, when the code encounters an error, indicate inputs, outputs or intermediary values, and count or perform other computations related to program execution, all of which can be used for further analysis of the execution of the software code.

Optionally, the functional service validator 216 can add other types of software code to the received code that is provided by a storage administrator, by way of example.

Referring back to FIG. 3, in step 315, the node computing device 106(1) computes a hash value for the received code once it is verified and validated (as illustrated above in step 310 and FIG. 4), and has been transformed (as illustrated above in steps 425, 430, 535, 440 and 445). In this example, the node computing device 106(1) can apply a hashing algorithm on verified, validated and transformed software code to generate a hash value which can then be used to determine if any further changes are made to the verified and validated software code.

Figure 3:
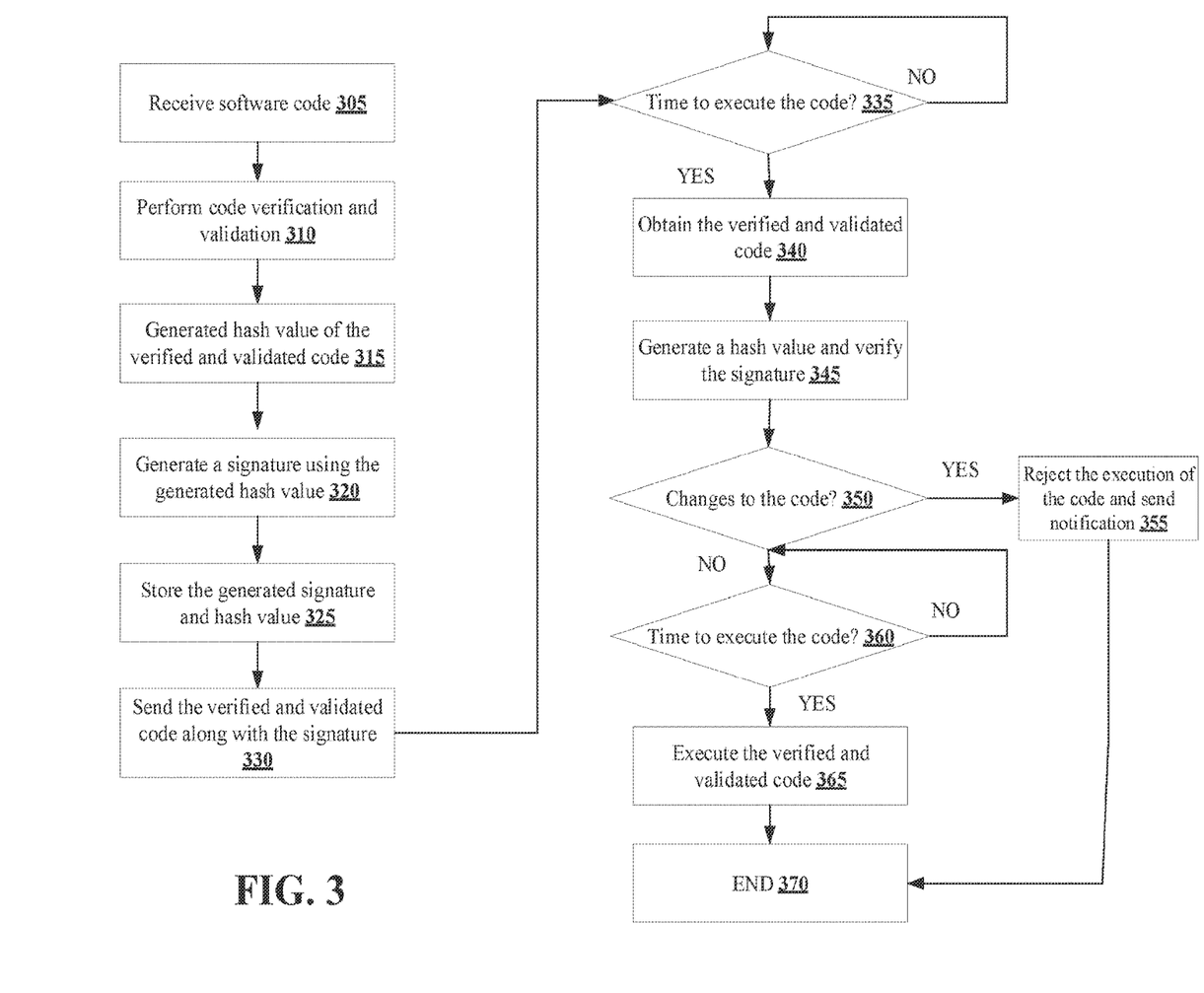
FIG. 3 is a flowchart of an exemplary method for method for managing verification and validation of third-party code.

In step 320, the node computing device 106(1) generates a digital signature for the verified and validated code using the generated hash value. In this example, the digital signature can be used to verify the authenticity and the integrity of the process of verifying, validating and transforming the software code.

Next in step 325, the node computing device 106(1) stores the generated hash value, the digital signature for the verified and validated code, and the identification data of associated permitted client devices 108(1)-108(n) within the memory 200, although the node computing device 106(1) can store the verified and validated code within storage devices or cache memory in other examples. Alternatively, in another example, the node computing device 106(1) can catalog and store the verified and validated code itself, along with the identification data of associated permitted client devices 108(1)-108(n) such that the verified and validated code can be locally retrieved at the time of execution. In yet another example, the client devices 108(1)-108(n) can receive and store the verified and validated code, to be submitted to a node computing device 106(1) at the time the client desires code execution.

In step 330, the node computing device 106(1) sends the verified and validated code along with the generated signature to the one of the client devices 108(1)-108(n) where the one of the client devices 108(1)-108(n) can temporarily store the verified and validated code and the signature, although the verified and validated code can be stored at other memory locations. Alternatively, in another example, if the node computing device 106(1) catalogs the verified and validated code, only the hash, an identifier provided by the client, or an identifier generated by the function validation service for the verified and validated code can be sent to the one of the client devices 108(1)-108(n). Alternatively, in another example, the node computing device 106(1) can store the verified and validated code along with the received function name within the memory 202, although the node computing device 106(1) can store the verified and validated code at other memory locations.

In step 335, the node computing device 106(1) determines when it is time to execute the verified and validated code and this determination can be made based on execution initiation techniques such as a command received from one of the client devices 108(1)-108(n) requesting for execution of the code, optimally using an identifier initially provided by the client or an identifier generated by the function validation service. Although in other examples, the node computing device 106(1) can determine whether it is time to execute the verified and validated code based on expiration of a pre-determined time or the position of the verified and validated code within a scheduled work queue. Alternatively, in yet another example, the node computing device 106(1) can determine when it is time to execute the verified and validated code when the node computing device 106(1) again receives the name of the function from one of the client devices 108(1)-108(n). Accordingly, when the node computing device 106(1) determines that it is not yet time to execute the verified and validated code, the exemplary flow continues to wait until it is time to execute the code. However, when the node computing device 106(1) determines that it is time to execute the code, then the Yes branch is taken to step 340.

In step 340, the node computing device 106(1) obtains the verified and validated code and/or the generated signature and the hash value from the one of the client devices 108(1)-108(n) that has requested for execution. Alternatively, in another example, the node computing device 106(1) can obtain the verified and validated code and/or the generated signature and the hash value that is cataloged and stored in the memory 200, cache memory, or within the queue of the memory 200.

In step 345, the node computing device 106(1) again generates a hash value on the verified and validated code that was obtained from the one of the client devices 108(1)-108(n) or from the catalog.

In step 350, the node computing device 106(1) compares the newly generated hash value generated above in step 345 with the digital signature and the hash value stored for the corresponding verified and validate code to determine if there are any changes to the software code that was previously verified and validated. In this example, if a change was made the verified and validated code that was temporarily stored at the one of the client devices 108(1)-108(n), then there would be a change to the hash value and the digital signature would not match. Similarly, if there were any alterations to the verified and validated code stored in the catalog, there would be a change to the hash value and the digital signature would not match.

Alternatively, in another example, the node computing device 106(1) can compare the hash value that is generated above in step 345 with the hash value that was obtained along with the verified and validated code in step 340 to determine if there are any changes to the code. In yet another example, the step of determining if there are any changes to the code may be optional if the verified and validated code was obtained from the memory 200, cache memory, or the queue, of the node computing device 106(1).

Referring back to step 350, if the node computing device 106(1) determines that there are changes to the verified and validated code, then the Yes branch is taken to step 355. In step 355, the node computing device 106(1) rejects the execution of the verified and validated code and sends out a notification to the one of the client devices 108(1)-108(n) that is requesting for the code to the executed and the exemplary flow proceeds to step 370 where the exemplary method ends.

However, back in step 350, if the node computing device 106(1) determines that there no changes to the verified and validated code, then the No branch is taken to step 360. In step 360, the node computing device 106(1) determines when it is time to execute the verified and validated code and this determination can be made based on a command received from one of the client devices 108(1)-108(n) requesting for execution of the code, optimally using an identifier initially provided by the client or an identifier generated by the function validation service. Although in other examples, the node computing device 106(1) can determine whether it is time to execute the verified and validated code based on expiration of a pre-determined time or the position of the verified and validated code within a scheduled work queue. Accordingly, when the node computing device 106(1) determines that it is not yet time to execute the verified and validated code, the exemplary flow continues to wait until it is time to execute the code. However, when the node computing device 106(1) determines that it is time to execute the code, then the Yes branch is taken to step 365.

In step 365, the node computing device 106(1) executes the verified and validated code at run-time and the exemplary flow proceeds to end at step 365. Alternatively, in another example, the node computing device 106(1) can execute the verified and validated code at run-time by simply calling the function name that is stored within the memory 202.

Accordingly, this technology provides a number of advantages including methods, non-transitory computer readable media, and devices that more effectively and efficiently manages verification and validation of third-party code. With the disclosed technology, the verification and validation phase of the software code is separated and decoupled from the execution phase. In the disclosed technology, when an end-user or application vendor wants to load a function (software code) into a Function as a Service (FaaS) platform, the function is first sent to a function validator service which performs the following operation: 1. validate the format and structure of the function; 2. validate security characteristics of the function; 3. add additional security functionality (e.g. extended input validation); 4. customize or translate the function for the FaaS platform; 5. add location-independent abstractions for data access; 6. add metering code and hooks; 7. add monitoring code and hooks; and 8. add other code as required/desired by the FaaS operator or virtual operator. Next, the validated and processed function is then added to an internal catalog and is deployed to the FaaS platforms for use. At this point, the function can be executed, and the added characteristics are ensured during execution. By using the above illustrated techniques, the disclosed technology is able to complete the verification and validation prior to run time thereby avoiding any latency that will occur to verify and validate third-party code at run-time.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method, comprising:
    verifying and validating, by a computing device, a received executable function to be executed on a function as a service (FaaS) platform, by applying one or more verification and validation techniques prior to runtime, the one or more verification and validation techniques including analyzing, by the computing device, the received executable function to determine the received executable function is free of malicious software code;
    determining, by the computing device, when the received executable function satisfies the applied one or more verification and validation techniques prior to temporarily storing the received executable function;
    rejecting, by the computing device, the received executable function from executing at runtime, when the determination indicates the received executable function fails to satisfy the applied one or more verification and validation techniques prior to temporarily storing the received executable function;
    temporarily storing, by the computing device, the verified and validated executable function when the determination indicates the received executable function satisfies the applied one or more verification and validation techniques; and
    executing, by the computing device, the temporarily stored verified and validated executable function at the runtime on the FaaS platform.

2. The method as set forth in claim 1, further comprising:
    determining, by the computing device, when the received executable function satisfies the applied one or more verification and validation techniques prior to the temporarily storing; and
    rejecting, by the computing device, the received executable function from executing at runtime when the determination indicates that the received executable function fails to satisfy the applied one or more verification and validation techniques prior to the storing.

3. The method as set forth in claim 1, further comprising:
    generating, by the computing device, a signature for the verified and validated executable function; and
    temporarily storing, by the computing device, the generated signature and the verified and validated executable function in a client device.

4. The method as set forth in claim 3, further comprising:
    obtaining, by the computing device, the verified and validated executable function from the client device at the runtime;
    verifying, by the computing device, a stored signature associated with the obtained verified and validated executable function to determine when there are one or more changes to the obtained verified and validated executable function; and
    executing, by the computing device, the obtained verified and validated executable function when the stored signature is verified at the runtime.

5. The method as set forth in claim 1, further comprising analyzing, by the computing device, the received executable function to determine that the format and the structure of the one or more instructions of the received executable function are compliant with the stored software code policy.

6. The method as set forth in claim 1, further comprising analyzing, by the computing device, the received executable function to determine that the received executable function is free of input validation errors.

7. A non-transitory machine readable medium having stored thereon instructions comprising machine executable code which when executed by at least one machine causes the machine to:
    verify and validate a received executable function to be executed on a function as a service (FaaS) platform, by applying one or more verification and validation techniques prior to runtime, the one or more verification and validation techniques including analyzing the received executable function to determine the received executable function is free of malicious software code;
    temporarily store the verified and validated executable function; and
    execute the temporarily stored verified and validated executable function at the runtime on the FaaS platform.

8. The non-transitory machine readable medium as set forth in claim 7, wherein the machine executable code, when executed by the machine, further causes the machine to:
    determine when the received executable function satisfies the applied one or more verification and validation techniques prior to the temporarily storing; and
    reject the received executable function from executing at runtime when the determination indicates that the received executable function fails to satisfy the applied one or more verification and validation techniques prior to the storing.

9. The non-transitory machine readable medium as set forth in claim 7, wherein the machine executable code, when executed by the machine, further causes the machine to:
generate a signature for the verified and validated executable function; and
temporarily store the generated signature and the verified and validated executable function in a client device.

10. The non-transitory machine readable medium as set forth in claim 9, wherein the machine executable code, when executed by the machine, further causes the machine to:
obtain the verified and validated executable function from the client device at the runtime;
verify a stored signature associated with the obtained verified and validated executable function to determine when there are one or more changes to the obtained verified and validated executable function; and
execute the obtained verified and validated executable function when the stored signature is verified at the runtime.

11. The non-transitory machine readable medium as set forth in claim 7, wherein the machine executable code, when executed by the machine, further causes the machine to analyze the received executable function to determine that the received executable function is free of input validation errors.

12. A computing device, comprising:
a memory containing machine readable medium comprising machine executable code having stored thereon instructions for managing workload within a storage system; and
a processor coupled to the memory, the processor configured to execute the machine executable code to cause the processor to:
verify and validate a received executable function to be executed on a function as a service (FaaS) platform, by applying one or more verification and validation techniques prior to runtime, the one or more verification and validation techniques including analyzing the received executable function to determine the received executable function is free of malicious software code;
determine whether the received executable function satisfies the applied one or more verification and validation techniques prior to temporarily storing the received executable function;
reject the received executable function from executing at runtime, when the determination indicates the received executable function fails to satisfy the applied one or more verification and validation techniques prior to temporarily storing the received executable function;
temporarily store the executable function; and
execute the temporarily stored executable function at the runtime on the FaaS platform.

13. The computing device as set forth in claim 12, wherein the processor is further configured to execute the machine executable code to further cause the processor to:
generate a signature for the executable function; and
temporarily store the generated signature and the executable function in a client device.

14. The computing device as set forth in claim 13, wherein the processor is further configured to execute the machine executable code to further cause the processor to:
obtain the executable function from the client device at the runtime; and
verify a stored signature associated with the obtained executable function to determine when there are one or more changes to the obtained executable function; and
execute the obtained executable function when the stored signature is verified at the runtime.

15. The computing device as set forth in claim 12, wherein the processor is further configured to execute the machine executable code to further cause the processor to analyze the received executable function to determine that a format and a structure of one or more instructions of the received executable function are compliant with a stored software code policy.

16. The computing device as set forth in claim 12, wherein the processor is further configured to execute the machine executable code to further cause the processor to insert input validation code to software code of the executable function to correct the input validation error upon determining the executable function has the input validation error based on an application of one or more data validation rules.

17. The computing device as set forth in claim 12, wherein the processor is further configured to execute the machine executable code to further cause the processor to replace each of one or more data access references in the verified and validated executable function with a location-independent abstraction
prior to temporarily storing the executable function.

* * * * *